(12) United States Patent
Single et al.

(10) Patent No.: US 8,786,220 B2
(45) Date of Patent: Jul. 22, 2014

(54) DEVICE AND METHOD FOR TAKING A SAFETY PRECAUTION IN AN ELECTRICAL TOOL

(75) Inventors: Ulrich Single, Penang (MY); Michael Habele, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 1005 days.

(21) Appl. No.: 12/810,639

(22) PCT Filed: Oct. 31, 2008

(86) PCT No.: PCT/EP2008/064825
§ 371 (c)(1),
(2), (4) Date: Sep. 13, 2010

(87) PCT Pub. No.: WO2009/083306
PCT Pub. Date: Jul. 9, 2009

(65) Prior Publication Data
US 2011/0007436 A1      Jan. 13, 2011

(30) Foreign Application Priority Data
Dec. 27, 2007 (DE) .......................... 10 2007 062 727

(51) Int. Cl.
*H02P 1/24* (2006.01)
(52) U.S. Cl.
USPC ............ 318/244; 318/251; 318/434; 318/476
(58) Field of Classification Search
USPC ......... 318/244, 245, 251, 252, 272, 275, 434, 318/474, 476
See application file for complete search history.

(56) References Cited

U.S. PATENT DOCUMENTS

| | | | | |
|---|---|---|---|---|
| 3,586,949 A | * | 6/1971 | Spear et al. | 318/257 |
| 4,270,164 A | * | 5/1981 | Wyman et al. | 363/56.03 |
| 4,300,079 A | * | 11/1981 | Kawada et al. | 388/843 |
| 5,038,084 A | * | 8/1991 | Wing | 318/268 |
| 5,563,482 A | * | 10/1996 | Shaw et al. | 318/272 |
| 5,672,948 A | * | 9/1997 | Cohen et al. | 318/603 |
| 5,789,885 A | | 8/1998 | Seel | |
| 6,222,331 B1 | * | 4/2001 | Blum | 388/809 |

(Continued)

FOREIGN PATENT DOCUMENTS

| | | |
|---|---|---|
| CN | 1905988 | 1/2007 |
| DE | 10 2004 004 170 | 8/2005 |

(Continued)

*Primary Examiner* — Bentsu Ro
*Assistant Examiner* — Thai Dinh
(74) *Attorney, Agent, or Firm* — Maginot, Moore & Beck

(57) ABSTRACT

The invention relates to a device (10) for taking a safety precaution in an electrical tool, said electrical tool comprising an electric motor (EM) with at least one field winding and an armature winding. The device (10) comprises the following features: a sensor unit (12) which is designed to generate a sensor signal (21) in accordance with a motor current (14) passing through the electric motor (EM), an armature voltage (16) via the armature winding, a voltage (18) via the field winding and/or a commutation frequency (20) in the armature winding; a unit (22) detecting a change of the sensor signal, which is designed to detect a temporal change of the sensor signal (21) and emit a corresponding modification signal (24) on the basis of the detected change; and a safety device (26) which is designed to take a safety precaution (28) in the electrical tool when a value of the modification signal (24) is exceeded or not met in relation to a threshold value.

10 Claims, 3 Drawing Sheets

(56) References Cited

U.S. PATENT DOCUMENTS

| | | |
|---|---|---|
| 6,225,769 B1 * | 5/2001 | Brenner et al. ............... 318/434 |
| 6,479,958 B1 | 11/2002 | Thompson et al. |
| 7,372,226 B2 | 5/2008 | Wiker et al. |
| 2008/0298784 A1 * | 12/2008 | Kastner ..................... 388/811 |

FOREIGN PATENT DOCUMENTS

| | | |
|---|---|---|
| RU | 2 020 715 | 9/1994 |
| RU | 2 277 289 | 5/2006 |
| SU | 1594367 | 9/1990 |

* cited by examiner

DEVICE AND METHOD FOR TAKING A SAFETY PRECAUTION IN AN ELECTRICAL TOOL

This application is a National Stage Application of PCT/EP2008/064825, filed 31 Oct. 2008, which claims benefit of Serial No. 10 2007 062 727.2, filed 27 Dec. 2007 in Germany and which applications are incorporated herein by reference. To the extent appropriate, a claim of priority is made to each of the above disclosed applications.

TECHNICAL FIELD

The present invention relates to a device for taking a safety precaution in an electrical tool as well as a method for taking a safety precaution in an electrical tool.

BACKGROUND

Modern electrical tools require special safety mechanisms in order to protect the operator of the electrical tool in the case of an unforeseen circumstance. This circumstance can, for example, consist of a blocking or a jamming of the tool. (Such a case is known to professionals in the field as "kickback.") If no safety mechanism is present, serious injury to the operator can occur from such a circumstance. On the other hand, the intended safety mechanisms should be cost effective and easy to implement.

An approach to protecting an operator has already been disclosed in the German patent publication DE 10 2004 004 170 A1/Aug. 18, 2005 with the title "Method for Switching Off an Electrical Power Tool in the Case of a Blockage and Electrical Power Tool". According to this approach, the detecting of the "kickback" case is, however, limited to an evaluation of the rotational speed. This merely offers a limited safety function because an evaluation of this type cannot be flexibly applied to different usage environments and furthermore is also cost intensive as a result of many parts being needed for detecting the rotational speed.

SUMMARY

The aim of the present invention therefore consists of creating a better option for taking a safety precaution in an electrical tool.

The aim is met by a device for taking a safety precaution in an electrical tool as well as a method for taking a safety precaution in an electrical tool.

The present invention creates a device for taking a safety precaution in an electrical tool, said electrical tool comprising an electric motor with at least one field winding and an armature winding and the device comprising the following features:

a sensor unit which is designed to generate a sensor signal in accordance with a motor current passing through the electric motor, an armature voltage via the armature winding, a voltage via the field winding and/or a commutation frequency in the armature winding;
  a unit detecting a change in the sensor signal, which is designed to detect a temporal change in the sensor signal and emit a corresponding modification signal on the basis of the detected change; and
  a safety device which is designed to take a safety precaution in the electrical tool when a value of the modification signal is exceeded or not met in relation to a threshold value.

The present invention is based on the fact that a load state of the electrical tool can be acquired by a simple tapping of motor parameters as the motor current, the armature voltage via the armature winding, a voltage via a field winding and/or the commutation frequency in the armature winding. This offers the advantage that elaborate sensors for acquiring the rotational speed at the motor shaft or other special circuits are not required. If a threshold value is exceeded, respectively not met, a blocking or jamming situation of said electrical tool can furthermore be recognized by determining the temporal change in the sensor signal in different work scenarios. In this way, the blocking or jamming of the tool can, for example, be better distinguished when on the one hand the operating speed is slow and when on the other hand the operating speed is fast. This results from the fact that only the temporal change in the load state of the electrical tool is relevant for triggering the safety function and not in contrast the corresponding absolute parameters. When using the approach according to the invention, a cost effective implementation can consequently be realized on the one hand by simple tapping points in the electric motor of the electrical tool, and on the other hand a very precise triggering of the safety precaution can occur when a safety-sensitive condition occurs.

In a special embodiment, the unit detecting a change of the sensor signal and/or the safety device is designed so as to carry out a digital signal processing. The advantage thereof is that the digital circuits, which are already extensively used for the control of the electrical tools, can simultaneously be used for triggering the safety precaution. At the same time, the use of digital components makes it possible to very robustly and reliably trigger said safety precaution even if electronic components are showing signs of aging, and at the same time makes it possible to be able to guarantee a high degree of precision and constancy in the triggering of the safety precaution.

It is also advantageous if the unit detecting a change of the sensor signal is designed so as to carry out a filtering of the sensor signal prior to recognizing a temporal change in the sensor signal. This offers the advantage that possible interferences to the sensor signal can be suppressed or at least dampened; thus enabling a higher degree of precision to be ensured during the triggering of the safety precaution. The probability of an undesired triggering of the safety precaution and the problems for the operator, which are related thereto, are thus avoided or at least significantly reduced.

The unit detecting a change of the sensor signal can also be designed so as to carry out a filtering on the basis of a linear, non-linear and or weighted filter function or to carry out a Fourier-transform of the sensor signal. If digital components are used, this makes it possible to ensure a high degree of precision when evaluating the sensor signal. At the same time, a resolution of the sensor signal into its frequency components can also occur by using the Fourier-transform. Said resolution allows for a detection of a quick change in frequency and thus for a triggering of a safety precaution with a short reaction time especially when receiving the commutation frequency at the armature winding of the electric motor. It is particularly advantageous in this context to consider the use of a FFT (FFT=Fast Fourier-transform), which makes it possible to carry out a very rapid transform.

According to another embodiment, the safety device can be designed so as to interrupt the power supply to the electrical tool, to initiate a mechanical braking of said electrical tool, to initiate an electric braking of said electrical tool, an electromechanical braking of said electrical tool and/or a blocking of said electrical tool by means of a mechanical or electrical device. This allows for a rapid braking of said electrical tool and thereby for a reliable protection of the operator from injury.

The sensor unit can also be designed in a further embodiment so as to generate a second sensor signal, which is different from the sensor signal, in accordance with a motor current passing through the electric motor, an armature voltage via the armature winding, a voltage via the field winding and/or a commutation frequency in the armature winding. Furthermore, the unit detecting a change of the sensor signal can be configured in this embodiment to detect a temporal change of the second sensor signal and emit a corresponding second modification signal on the basis of the detected change. Finally the safety device can also be designed in this embodiment to take the safety precaution in the electrical tool when a value of the modification signal exceeds or does not meet the threshold value. This makes it possible to ensure an additional safeguard against the faulty triggering of the safety precaution because said triggering in this case would occur only as a result of two threshold values being exceeded or not being met. This type of embodiment is therefore more tolerant towards interferences to the sensor signal or the second sensor signal.

Furthermore, the safety device can be designed in another embodiment to use a threshold value dependent upon the sensor signal or to use an externally adjustable threshold value when taking the safety precaution. This makes it possible on the one hand to make variable safety threshold values adjustable, which also take into account an overloading of the machine. In addition, a lower triggering threshold can, for example, be adjusted by the coupling of the threshold values with the sensor signal in order to ensure a timely braking of the electrical tool when the operating speed is high. It is also conceivable that an operator can adjust to a special, desired threshold value if he, for example, is working in a particularly critical work environment. In summary it can be said that the safety of the operator of the electrical tool can be increased by the use of the variable threshold value.

In a further embodiment, the sensor can be designed to detect a position of the electrical tool and/or a fixing state of a tool mounted on said electrical tool; and in so doing the safety unit can be designed to use a threshold value dependent on the detected position of said electrical tool and/or the fixing state of the tool mounted on said electrical tool when taking the safety precaution. This has the advantage of a different position of said electrical tool (for example "working overhead") and/or a different fixing state of a tool (for example a thick or thin drill bit, respectively a chipped grinding wheel of an angle grinder) being taken into account when determining the threshold value. The safety of the operator is thereby once again additionally increased without said operator having to do anything himself).

In another embodiment of the invention, a method for taking a safety precaution in an electrical tool is provided, wherein said electrical tool comprises an electric motor with at least one field winding and an armature winding and wherein said method includes the following steps:

generation of a sensor signal in accordance with a motor current passing through the electric motor, an armature voltage via the armature winding, a voltage via the field winding and/or a commutation frequency in the armature winding;

detection of a temporal change of the sensor signal and emission of a corresponding modification signal on the basis of the detected change; and the taking of a safety precaution in the electrical tool when a value of the modification signal is exceeded or not met in relation to a threshold value.

A computer program with a program code for carrying out the method mentioned above can also be provided if the computer program is executed on a computer. This makes it possible to once again use the control of the taking of the safety precaution by means of integrated circuits in electrical tools, which are often already present, or small computers. The same applies as well to the triggering of said safety measure. Reduction of costs is thus realized.

BRIEF DESCRIPTION OF THE DRAWINGS

The invention is explained below in detail with the aid of the accompanying drawings. The following are shown.

Elements, which are the same or are functionally the same, are denoted below with the same reference numerals. The absolute values and dimensions indicated below are merely exemplary values and do not represent a limitation of the invention to dimensions of this kind.

DETAILED DESCRIPTION

Electronics are used in modern electrical devices or electrical tools to implement a control system, an increase in output, safeguards or auxiliary functions. The electronics in modern electrical tools are therefore often equipped with a microcontroller, with whose help these functions are implemented.

The approach that is presented here describes on the one hand a safeguard for an electrical tool, an electric machine tool or an electrical device and on the other hand a safeguard for the user. The device to be protected as, for example, an electrical tool, an electric machine tool or an electrical device is simply referred to below as an "electrical device". In the approach presented here, a signal, which is proportional to the rotational speed of or the load on the machine or the electrical device, is generated from one or a plurality of motor parameters, as, for example, motor current, armature voltage or similar parameters. The derivative, for example, is formed from the signal, which is proportional to the rotational speed and the load on the motor. The result is, for example, the speed of the change in rotational speed, the speed of the change in load or a value proportional to these quantities. If, e.g., the speed of the change in rotational speed or the speed of the change in load exceeds a predetermined threshold value in a predetermined time interval, a defined change in state is brought about in the electrical device. The defined change in state can, e.g., be the interruption of the power supply or a targeted braking or blocking of the machine with an auxiliary device.

An effective safeguard for the operator and the electrical device results if the tilting or the jamming of an angle grinder is detected and, e.g., the power supply to the electrical device is turned off. This case, triggered, e.g., by a tilting or jamming of an electrical device, is designated below as "kickback" as was already described above.

In the approach described here, a variable proportional to the rotational speed is used for detecting the case of a kickback, which, e.g., is obtained from the motor parameters:

motor current and/or armature voltage or a combination of the two. The present description alternatively provides for a variable proportional to the load on the machine to be evaluated in order to detect the case of kick back. The load on the machine can, e.g., be derived from the physical motor parameters like motor current. The motor current can, e.g., be detected at a shunt and can be optionally evaluated via a suitable analog or digital circuit. The approach described here provides further for a variable proportional to the load on the machine as, for example, the voltage drop at a field winding of the electric motor to be processed by a suitable analog or digital circuit and to be correspondingly evaluated. As an alternative to the method mentioned above, the rotational speed can also be obtained from the commutation frequency in the armature winding.

Figure 1:
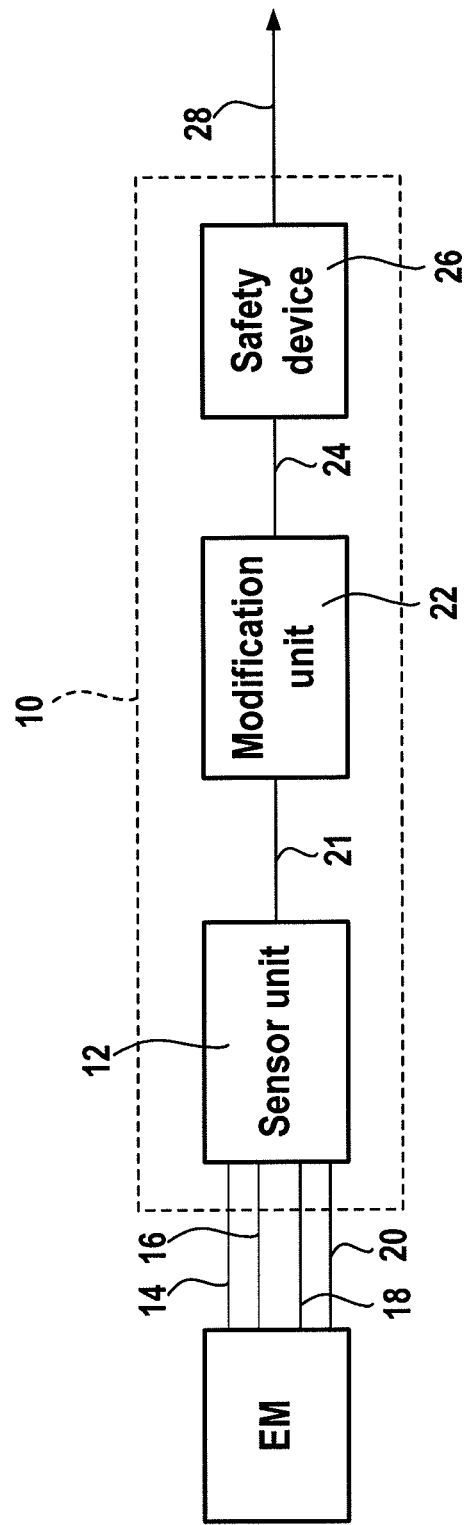
FIG. 1 a block diagram of device according to an embodiment of the invention.

From the functional standpoint, the approach presented here leads to a device as it is depicted in the block diagram according to FIG. 1. In this case, provision is made for a device 10 for taking of a safety precaution in an electrical tool, said electrical tool comprising an electric motor EM with at least one field winding and an armature winding. Said electrical tool can thereby be a power drill, an angle grinder, a planar or the like, this machine tool however being driven by an electric motor. The device includes a sensor unit, which is designed to generate a sensor signal in accordance with a motor current 14 passing through the electric motor EM, an armature voltage 16 via the armature winding, a voltage 18 via the field winding and/or a commutation frequency 20 in the armature winding. These motor parameters are then supplied by the corresponding signals of the sensor unit 12, respectively said sensor unit 12 taps the variable(s) required in each case via the "tapping options" 14 to 20. The variable(s) do not all have to be used but rather even only one single variable of those mentioned above can be evaluated or more than one variable can be detected, evaluated and correspondingly jointly interpreted. The sensor unit 12 then generates the sensor signal, which is emitted on the basis of the detected measured variables. A sensor signal can also be generated, which comprises the information of a plurality of measured variables (for example as a bus signal). This sensor signal is supplied to a unit 22 detecting a change of the sensor signal, which is designed to detect a temporal change of the sensor signal 21 and emit a corresponding modification signal 24 on the basis of the detected change. The evaluation of the temporal change behavior can, for example, occur on the basis of a derivation formation of the sensor signal. This is particularly efficient if the unit 22 detecting a change of the sensor signal carries out the derivation on a digital level because in this case a fast and reliable calculation of the derivation of the sensor signal is possible on account of the already present routines of the digital signal processing. Finally the modification signal 24 is supplied to a safety device 26, which is designed to take a safety precaution in the electrical tool when a value of the modification signal is exceeded or not met in relation to a threshold value. This safety precaution can, for example, occur during an interruption of the power supply to the electric motor and/or during an electrical or mechanical braking of the electrical tool, which can be controlled via the control signal 28 from the safety device 26. If a plurality of the previously mentioned safety precautions are taken at the same time or temporally slightly offset from one another, the effect of the safety precaution is substantially increased. Alternatively the braking unit and/or the circuit breaker for turning off the power supply can be disposed in the safety device so that the external control signal 28 is no longer required.

Advantages with respect to the conventional approach occur by virtue of the fact that no additional rotational speed sensors as, e.g., a tachometer and no additional sensors as, e.g., impulse pickups for detecting and evaluating the case of a kickback are required.

The approach presented here describes a device, with whose help a fast change in rotational speed or change in load, which is caused, e.g., by a jamming or blocking of an electrical device, is detected and a change of state in the electrical device is brought about, which leads to the protection of the operator(s) and to that of the electrical device. Advantages resulting from the approach presented occur primarily in the configuration of the electrical device, respectively of the required sensors in the electrical device.

Generation of a Signal Proportional to the Rotational Speed or a Signal Proportional to the Load on the Electrical Device A detailed description of the detection and evaluation of a signal proportional to the rotational speed or a signal proportional to the load on the machine is thoroughly presented in the patent application "Motor Parameters-Detector and Method for Generating a Rotational Speed Detection Signal and/or a Torque Detection Signal" by the same applicant and inventor. Said patent application was submitted on the same day of application as the present patent application. The patent application "Motor Parameters-Detector and Method for Generating a Rotational Speed Detection Signal and/or a Torque Detection Signal" is hereby accommodated in its entirety in the present patent application by using explicit references.

The generation of a signal proportional to the rotational speed or one proportional to the load on the machine can, e.g., be generated from the following variables or similar variables:

X Motor current and/or armature voltage
X Motor voltage
X Induced Voltage in a Winding or in an Auxiliary Winding
X Evaluation of the Commutation Frequency The generation of a signal proportional to the rotational speed of or load on the machine is described in detail in the aforementioned patent application "Motor Parameters-Detector and Method for Generating a Rotational Speed Detection Signal and/or a Torque Detection Signal". The approach described therein is thereby characterized in that at least one additional cable to the armature of the motor is required.

The generation of a signal proportional to the load on the machine is described in detail in the aforementioned patent application "Motor Parameters-Detector and Method for Generating a Rotational Speed Detection Signal and/or a Torque Detection Signal". In the simplest case, no or alternatively one additional cable to the electric motor is required for the method according to the invention.

As an alternative to the approaches mentioned above, the induced voltage can also be evaluated in a winding or in an auxiliary winding and a signal proportional to the rotational speed or to the load on the machine can be generated from this.

Provision is made in an additional approach for the rotational speed to be generated from the commutation frequency of the armature. For this purpose, the commutation frequency is picked off at the armature and is, for example, further amplified via a suitable analog or digital circuit. A signal proportional to the rotational speed is obtained, e.g., via the resolution of the obtained signal into the embodied frequency fractions, e.g., with the aid of a Fourier transform. A signal proportional to the rotational speed can be generated via, e.g., a plausibility check or selective filtering or a similar method.

Evaluating the Signal Dependent on the Rotational Speed or the Load

The evaluation of the signal for detecting, e.g., a "kickback", which is dependent on the rotational speed or the load, can as in the previously described patent application "Method for Turning off an Electric Machine Tool in a Blocking Situation and Electric Machine Tool" result from calculating the difference from half-cycle to half-cycle. If the difference exceeds a threshold value X at a discrete point in time t, a change in state is brought about.

This approach can be easily put into practice. It can, however, be optimized by further mathematical methods. As described above, a signal proportional to the rotational speed of the electrical device or the load on the electrical device is generated for this purpose. Of course, the rotational speed instead of a signal proportional to the rotational speed can be used for the evaluation according to this method. Interferences to the signal proportional to the rotational speed frequently occur in practice. Interferences can, e.g., be the result of electrical brush sparking, disruptions in mains power, other machines and the like.

Interferences to the signal proportional to the rotational speed can, e.g, be reduced or eliminated by suitable filters as, e.g., presence filters, absence filters, band-pass filters, high- and low-pass filters, Butterworth filters, Tschebyscheff filters, Bessel, respectively Thomson, filters, Cauer filters, rank value filters (e.g. minimum filters, median filters, maximum filters), IIR filters (infinite duration impulse response filter) and FIR filter (finite impulse response filter).

The approach presented here provides all current linear, non-linear and weighted filter functions or similar mathematical methods for the purpose of filtering. The evaluation is facilitated by the temporal change of the signal being formed. The evaluation of a signal proportional to the rotational speed or the load is illustrated here in detail using a practical example with a two-handed angle grinder.

Figure 2:
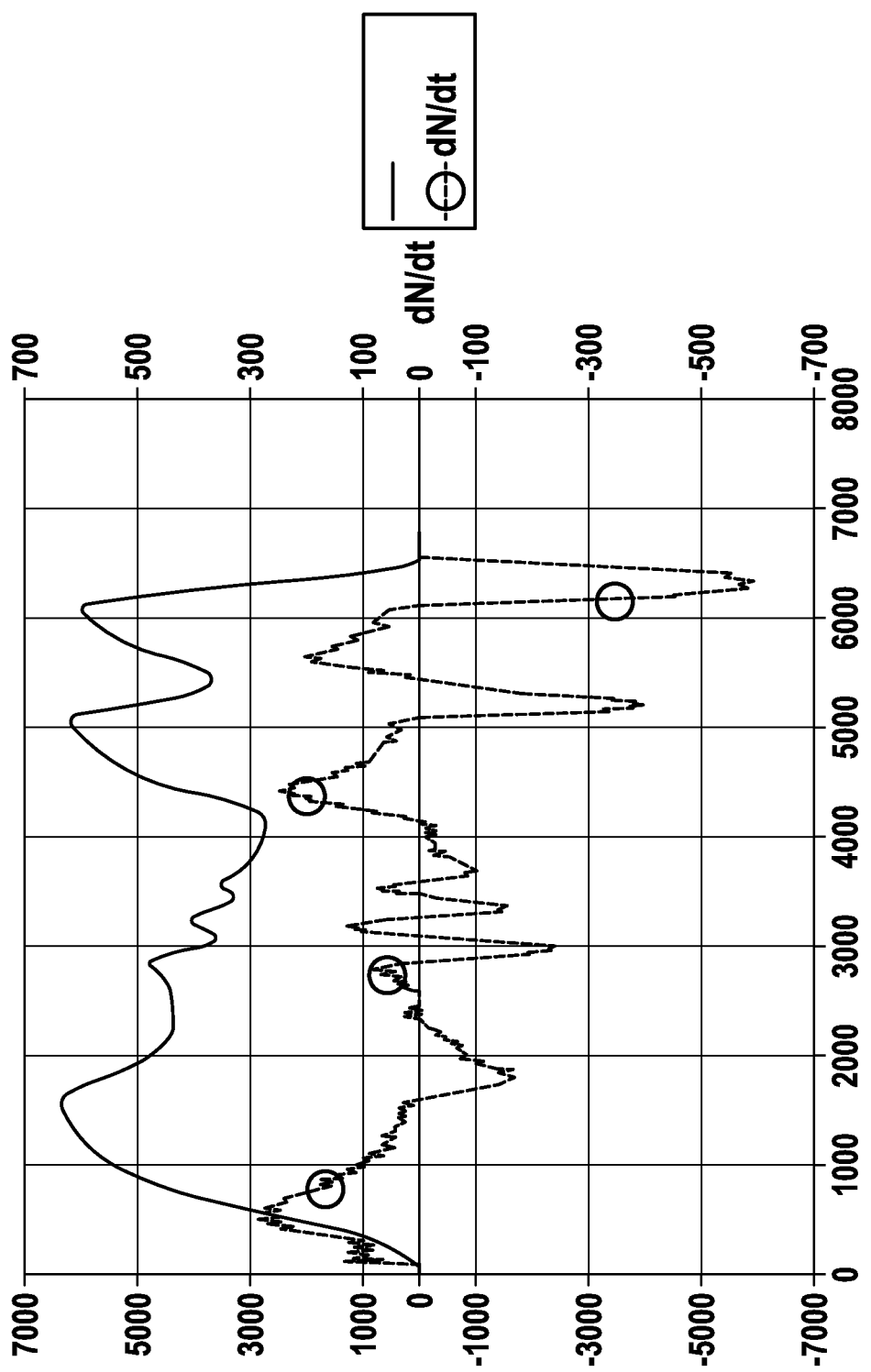
FIG. 2 a diagram of a rotational speed and a temporal change in said rotational speed from a practical example.

The signals depicted in FIG. 2 were plotted for a two-handed angle grinder. The two-handed angle grinder in this example has a rotational speed when idling of approximately 6500 rpm. Said two-handed angle grinder from FIG. 2 was irregularly loaded while working on a workpiece. At the end of the test, it got stuck in said workpiece, and a "kickback" resulted. The signal proportional to the rotational speed is depicted in FIG. 2 with a dark line. Interferences to the signal proportional to the rotational speed could be largely eliminated with a median filter.

The temporal change in the rotational speed dN/dt is highlighted with a circle. If the temporal change in the rotational speed exceeds a value of, e.g., −500, a kickback is detected. A change in state in the electrical device can be induced. Possible changes in state in the electrical device are described in the section "Possible Changes in State upon Detecting, e.g., a Kickback in the Electrical Device".

The threshold value for triggering the kickback function can be varied as a function of parameters or machine parameters.

Possible parameters or machine parameters are:
the rotational speed or a signal proportional to the rotational speed
the load on the machine or a signal proportional to the load on the machine
a signal which is formed with the aid of, e.g., additional sensors in the electrical device. This signal can, e.g., supply information as to how the machine is held or fixed.
via an operating element, which is available to the operator via an operator input If, e.g., a kickback is detected in the electrical device, a defined change in stare in the electrical device is induced. The defined change in state can, e.g., be an interruption of the power supply or a targeted braking or blocking of the machine with an auxiliary device.

Figure 3:
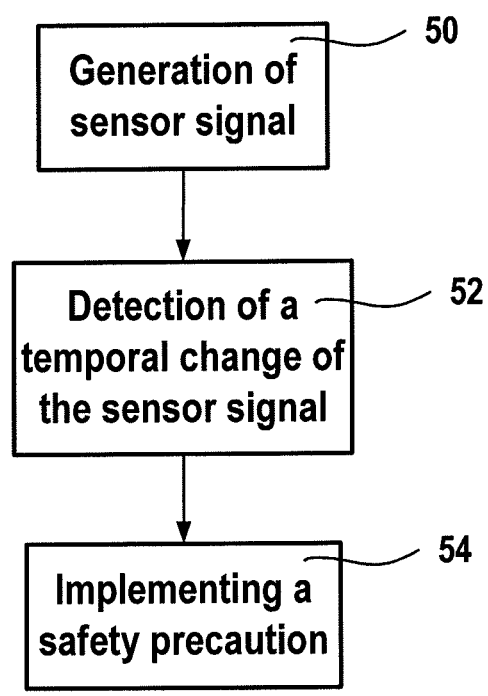
FIG. 3 a flow diagram of a method according to an embodiment of the invention.

Possible changes in state are, for example:
interruption of the power supply of the electrical device
mechanical braking of the electrical device
electrical braking of the electrical device
electromechanical braking of the electrical device
blocking the electrical device by means of a mechanical or electrical device According to the description above, the inventive approach can also be laid out in the form of the flow diagram of a method depicted in FIG. 3. In this instance, the method comprises a step of the generation 50 of a sensor signal in accordance with a motor current passing through the electric motor, an armature voltage via the armature winding, a voltage via the field winding and/or a commutation frequency in the armature winding. The method furthermore comprises the step of the detection 52 of a temporal change of the sensor signal and the emission of a corresponding modification signal on the basis of the detected change. Finally the method comprises the step of taking 54 a safety precaution in the electrical tool when a value of said modification signal is exceeded or not met in relation to an upper, respectively lower, threshold value.

In summary it should be noted that the following aspects can be implemented with the present invention:
evaluation of a signal proportional to the rotational speed or load on the machine and the bringing about of a change in state in the electrical device if a predetermined threshold value is exceeded in a predetermined time interval
evaluation of the speed of the change in rotational speed and/or speed of the change in load and the triggering of a change in state in the electrical device when a certain threshold value X is exceeded, respectively not met, at a certain point in time t
acquisition of the signal proportional to the rotational speed or the load on the machine without additional sensors in the machine
acquisition of the motor parameters: motor current and/or armature voltage without the aid of additional cables or with the aid of but one additional cable to the motor
simple acquisition of the motor parameters: armature voltage and armature current via a scanning method as its is described in the patent application "Motor Parameter-Detector and Method for Generating a Rotational Speed Detection Signal and/or a Torque Detection Signal" and
creation of a signal proportional to the rotational speed from the commutation frequency

The invention claimed is:

1. A device for taking a safety precaution in an electrical tool, said electrical tool comprising an electric motor with at least one field winding and an armature winding and said device comprising the following features:
a sensor unit, which is designed to generate a first sensor signal in accordance with an armature voltage via the armature winding, a voltage via the field winding or a commutation frequency in the armature winding;
the sensor unit being designed to generate a second sensor signal in accordance with an armature voltage via the armature winding, a voltage via the field winding or a commutation frequency in the armature winding, the second sensor signal being different from the first sensor signal;

a unit detecting a change of the first sensor signal, which is designed to detect a temporal change of the first sensor signal and emit a corresponding first modification signal on the basis of the detected change; and a safety device, which is designed to take a safety precaution in the electrical tool dependent on a value of the first modification signal, particularly when the value of said first modification signal is exceeded or not met in relation to a threshold value.

2. The device according to claim 1, wherein the unit detecting a change of the first sensor signal or the safety device is designed to carry out a digital signal processing.

3. The device according to claim 1, wherein the unit detecting a change of the first sensor signal is designed to carry out a filtering of the first sensor signal prior to detecting a temporal change of the first sensor signal.

4. The device according to claim 3, wherein the unit detecting a change of the first sensor signal is designed to carry out a filtering on the basis of a linear, non-linear or weighted filter function or to carry out a Fourier transform of the first sensor signal.

5. The device according to claim 1, wherein the safety device is designed to interrupt the power supply of the electrical tool, to induce a mechanical braking of said electrical tool, an electrical braking of said electrical tool, an electromechanical braking of said electrical tool or a blocking of said electrical tool by means of a mechanical or electrical device.

6. The device according to claim 1, wherein
the unit detecting a change of the first sensor signal is designed to detect a temporal change of the second sensor signal and emit a corresponding second modification signal on the basis of the detected change;
the safety device is designed to take the safety precaution in the electrical tool when a value of the first modification signal exceeds or does not meet the threshold value and also when a value of the second modification signal exceeds or does not meet a second threshold value.

7. The device according to claim 1, wherein the safety device is designed to use a threshold value that is dependent on the first sensor signal or on an externally adjustable threshold value when taking the safety precaution.

8. The device according to claim 1, wherein the sensor unit is designed to acquire a position of the electrical tool or a fixing state of a tool clamped onto said electrical tool and wherein the safety device is designed to use a threshold value dependent on the acquired position of the electrical tool or the fixing state of the tool clamped onto the electrical tool.

9. A method for taking a safety precaution in an electrical tool, said electrical tool comprising an electric motor with at least one field winding and an armature winding and wherein said method includes the following steps:
generating a first sensor signal in accordance with an armature voltage via the armature winding, a voltage via the field winding or a commutation frequency in the armature winding;
generating a second sensor signal in accordance with an armature voltage via the armature winding, a voltage via the field winding or a commutation frequency in the armature winding, the second sensor signal being different from the first sensor signal;
detecting a temporal change of the first sensor signal and emission of a corresponding modification signal on the basis of the detected change; and
taking a safety precaution in the electrical tool when a value of the modification signal is exceeded or not met in relation to a threshold value.

10. A computer program with program code for carrying out the method according to claim 9 if said computer program is executed on a computer.

* * * * *